(12) United States Patent
Marshall et al.

(10) Patent No.: US 6,340,061 B2
(45) Date of Patent: Jan. 22, 2002

(54) LAWN AND GARDEN TOOL

(75) Inventors: James W. Marshall, Towson; James A. Martin; Wendell B. Leimbach, both of Baltimore, all of MD (US)

(73) Assignee: AME Group, Incorporated, Towson, MD (US)

( * ) Notice: Subject to any disclaimer, the term of this patent is extended or adjusted under 35 U.S.C. 154(b) by 0 days.

(21) Appl. No.: 09/739,553

(22) Filed: Dec. 18, 2000

Related U.S. Application Data

(63) Continuation of application No. 09/352,289, filed on Jul. 13, 1999, now Pat. No. 6,189,627.

(51) Int. Cl.$^7$ ................................................ A01B 33/00
(52) U.S. Cl. .......................................... 172/41; 172/25
(58) Field of Search ...................... 172/25, 41, 42, 172/15, 57–59, 375, 110, 111, 112, 125; 56/12.7, 17.5; 15/22.1, 23, 73, 28, 112

(56) References Cited

U.S. PATENT DOCUMENTS

| | | | | |
|---|---|---|---|---|
| 2,975,848 A | | 3/1961 | Roberts ...................... 175/192 |
| D252,879 S | | 9/1979 | Lessig, III et al. ........... D15/12 |
| 4,213,504 A | | 7/1980 | Schneider ....................... 172/25 |
| 4,260,169 A | * | 4/1981 | Hall ................................ 279/62 |
| 4,293,041 A | | 10/1981 | Holmstadt et al. ............ 172/39 |
| 4,366,871 A | | 1/1983 | Dieterle et al. .............. 173/163 |
| 5,136,197 A | * | 8/1992 | Hallett ........................... 310/83 |
| 5,207,697 A | * | 5/1993 | Carusillo et al. ............ 606/167 |
| 5,802,724 A | | 9/1998 | Rickard et al. ............. 30/296.1 |
| 5,809,653 A | | 9/1998 | Everts et al. .................. 30/122 |
| 5,850,882 A | * | 12/1998 | Link ............................. 172/41 |
| 5,870,790 A | * | 2/1999 | Root et al. ..................... 15/22.1 |
| 6,056,217 A | * | 5/2000 | Friden .......................... 241/135 |

* cited by examiner

*Primary Examiner*—Robert E. Pezzuto
(74) *Attorney, Agent, or Firm*—Leonard Bloom

(57) ABSTRACT

A hand-held portable lawn and garden tool having implements. A housing encloses a motor and at least two sets of gears arranged in cascade to provide low speed and high torque to the implements. Each set of gears is a sun gear with a plurality of planetary gears. The tool may be energized by battery packs, line power or internal combustion engines.

17 Claims, 20 Drawing Sheets

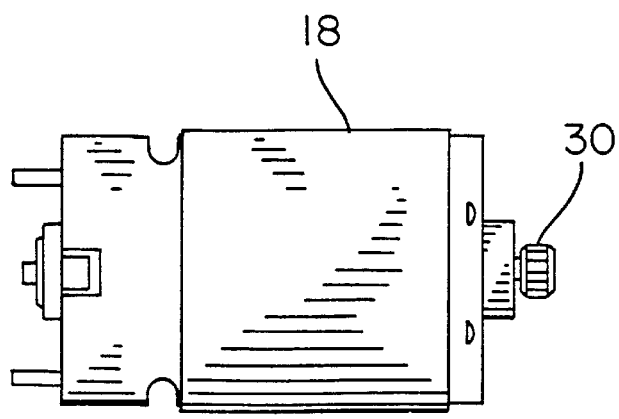
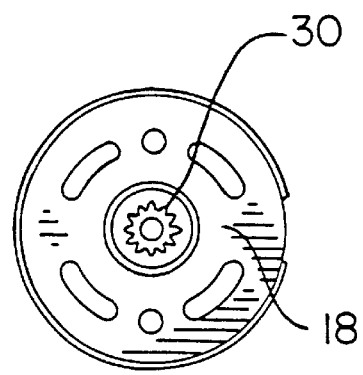
FIG. 4          FIG. 5
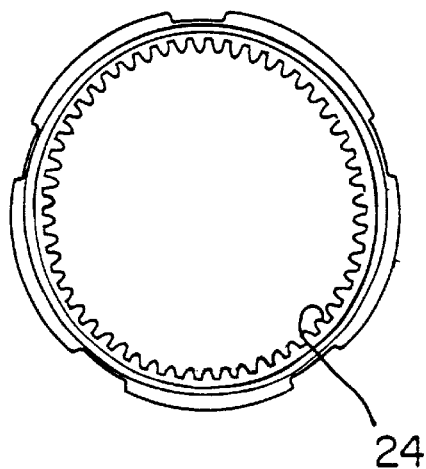
FIG. 6

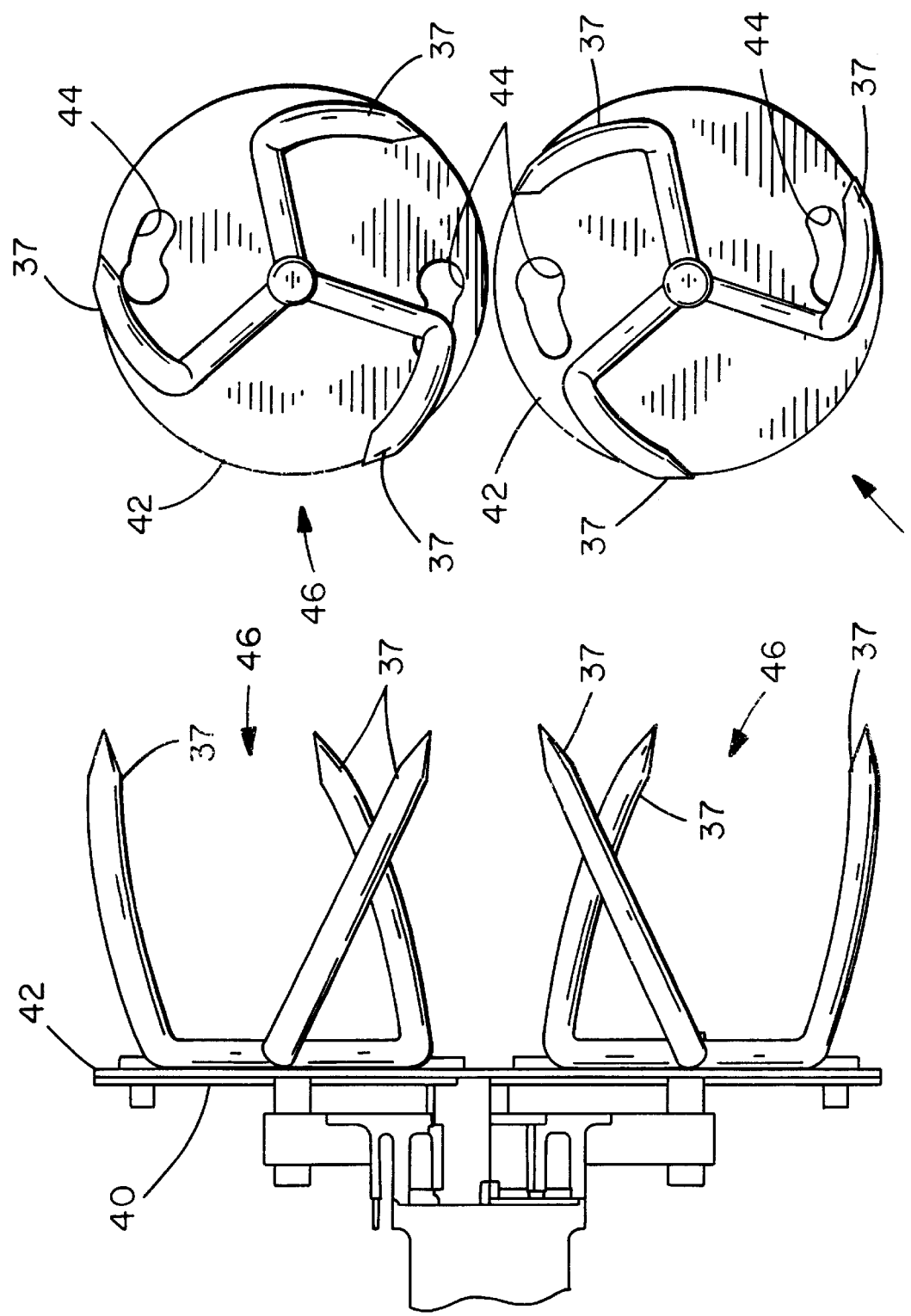

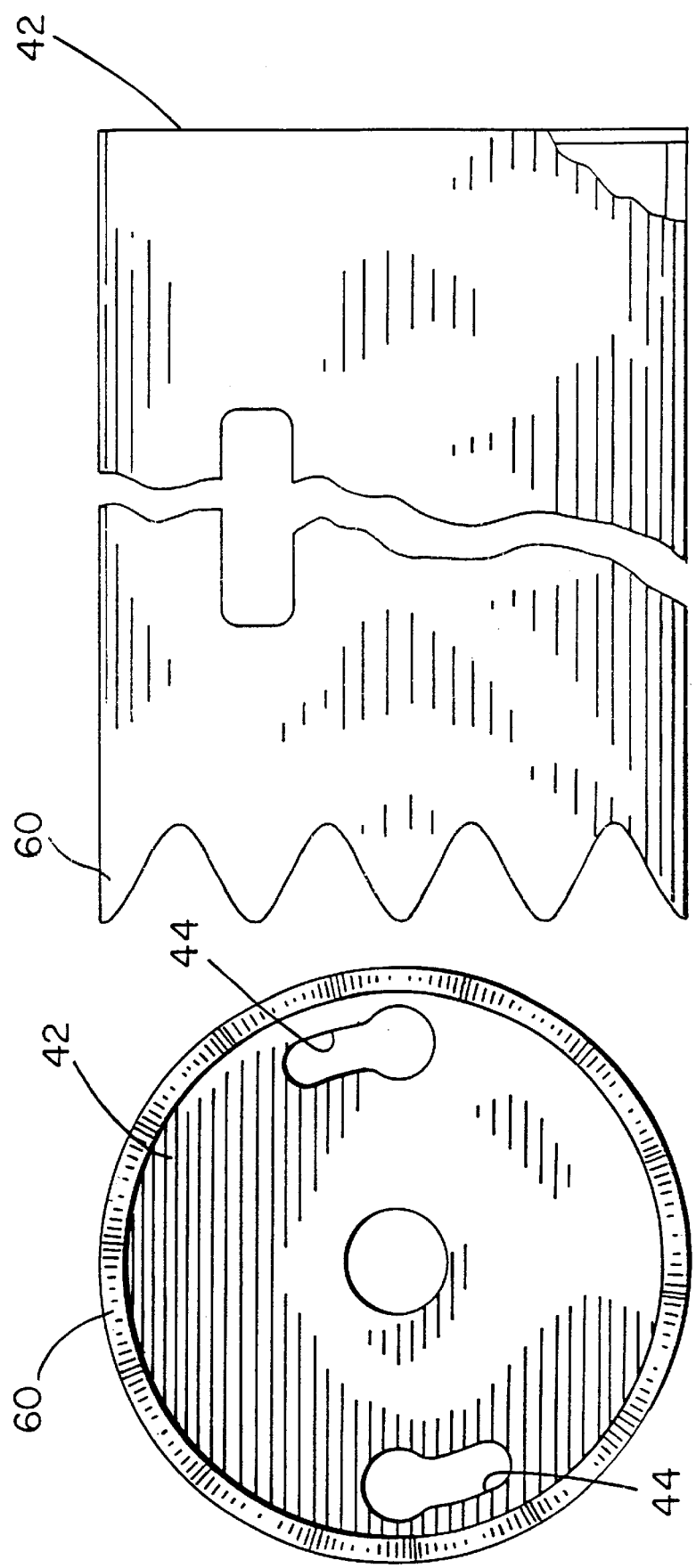

LAWN AND GARDEN TOOL

This application is a continuation, division, of application Ser. No. 09/352,289 filed Jul. 13, 1999, which is incorporated by reference herein in its entirety, now U.S. Pat. No. 6,189,627.

FIELD OF THE INVENTION

The present invention relates to a lawn and garden tool and, more particularly to a portable tool having interchangeable implements which operate at high torque and low speed.

BACKGROUND OF THE INVENTION

Preparation and maintenance of lawns and gardens has great commercial and homeowner interest. Portable tools for work on lawns and gardens are largely manually operated. In recent years, the use of powered tools has increased especially gasoline engine and electrically powered tools. These tools include lawn edgers, trimmers, cultivators, leaf blowers and hedge trimmers.

In U.S. Pat. No. 4,213,504 Schneider discloses a rotary, hand-held apparatus for performing various soil working operations. The soil working implements selectively include soil engaging tines, auger, drill, etc. The device may employ manual, electrical, gas, etc. power sources and cultivating, mulching, weeding, boring, etc. implements. In one embodiment, an electric drill is secured to a handle to drive the implements. In U.S. Pat. No. 4,293,041 Holmstadt et al disclose a power cultivator with a debris-excluding barrier and scraper, wherein the tillers are counter-rotated and include interdigitating tines which engage and move the earth forwardly. Worm gears on the tillers are driven by a common centrally located shaft mounted worm gears. Rickard et al in U.S. Pat. No. 5,802,724 and Everts et al in U.S. Pat. No. 5,809,653 disclose a coupling for a split-boom power tool having an attachment which may include a hedge trimmer, line trimmer, pruner, blower or extension. The motor directly drives the attachment, there being no gearing therebetween. Lessig III et al in U.S. Pat. No. D 252,879, disclose an electric-powered earth tiller.

In U.S. Pat. No. 2,975,848 Roberts discloses a portable power-driven device for boring holes which has a pinion gear on the power shaft of the motor and a larger driven gear meshing with the teeth of the pinion gear. The driven gear is attached to the shaft of a chuck. In U.S. Pat. No. 4,366,871 Dieterle et al disclose a motor-driven screwdriver, wherein a planetary gear carrier carries a plurality of circumferentially-displaced planet gears meshing with a pinion driven by the motor of the screwdriver. The screwdriver does not have a cascade of planet gears.

There is a need for a portable power-driven lawn and garden tool which has interchangeable implements.

BRIEF SUMMARY OF THE INVENTION

It is an object of the present invention to provide a portable, power-driven lawn and garden tool which has interchangeable implements and the implements are driven at high torque and low speed.

In accordance with the teachings of the present invention, there is disclosed a hand-held portable power driven tool for using a tool implement. A housing encloses a permanent magnet electric motor. The motor drives a planetary gear system having at least two sets of gears arranged in cascade to provide a low speed, high torque output. The output of the gear system drives the tool implement. The motor is powered by at least one rechargeable battery pack, the battery pack being replaceably inserted into the lawn and garden tool.

In further accordance with the teachings of the present invention, there is disclosed a portable, hand-held lawn and garden tool which has a wand having a first end and an opposite second end. A handle is connected to the first end and a housing is connected to the second end. A first set of gears is disposed in the housing, the first set of gears being a sun gear engaging a plurality of planetary gears. A plurality of sets of gears similar to the first set of gears are provided, the sets of gears being connected in cascade to an output shaft. A plurality of implements are provided. A selected one of the implements is removably attached to the output shaft connected to the cascade of sets of gears, wherein the respective implements are interchangeable. Means are provided for driving the sets of gears connected to the sets of gears such that the selected implement is driven at a selected high torque and a selected low speed dependent upon the arrangement of the plurality of sets of gears.

Also in accordance with the teachings of the present invention, there is disclosed a portable lawn and garden tool. The tool has a wand having a first end and an opposite second end. A handle is connected to the first end. A motor in a housing is attached to the second end. A source of power is provided for the motor and a switch is disposed in the handle to control the power to the motor. A first set of gears is attached to the motor within the housing. The first set of gears is a sun gear engaging a plurality of planetary gears. A plurality of sets of gears similar to the first set of gears is provided, the sets of gears being connected in cascade. A plurality of implements are provided, a respective one of the plurality is removably attached to the cascade of sets of gears. The respective implements are interchangeable. The implement is driven at a selected high torque and a selected low speed depending upon the arrangement of the plurality of sets of gears.

Still further in accordance with the teachings of the present invention, there is disclosed, in a lawn-and-garden tool, the combination of a housing having a longitudinal axis and further having respective side portions. Each of the respective side portions has an opening formed therein generally parallel to the longitudinal axis of the housing. At least one slide-in rechargeable battery pack is removably received in each of the openings in the housing, such that the housing is balanced. A permanent magnet motor is disposed within the housing and selectively energized by the battery packs. A plurality of planetary gear systems are driven by the motor and arranged in cascade in the housing. An output shaft is powered by the planetary gear systems, the output shaft having a relatively-low output speed and, conversely, a relatively-high output torque. A tool implement is disposed externally of the housing and driven by the output shaft.

In another aspect of the present invention, there is disclosed a tool having a drive means having a motor. A gear system having a plurality of planetary gear is driven by the motor. A single ring gear engages the plurality of planetary gears.

These and other objects of the present invention will become apparent from a reading of the following specification taken in conjunction with the enclosed drawings.

BRIEF DESCRIPTION OF THE DRAWINGS

FIG. 4 is a side elevation of the motor and gear.

FIG. 5 is a bottom plan view of the motor showing the input gear.

FIG. 6 is a bottom plan view of the internally toothed annulus.

FIG. 17 is a perspective view of the tiller implement being moved toward the tool.

FIG. 18 is a perspective view showing the pins on the tool being inserted into the slots in the implement.

FIG. 19 is a perspective view showing the twisting of the implement with respect to the tool to lock the pins in the slots.

FIG. 30 is a side elevation view of a side-by-side tiller implement.

FIG. 31 is a top plan view of the side-by-side tiller implement.

FIG. 36 is an end view of a core drill mounted on the implement plate.

FIG. 37 is a side elevation view of the core drill mounted on the implement plate.

DESCRIPTION OF THE PREFERRED EMBODIMENTS

Figure 1:
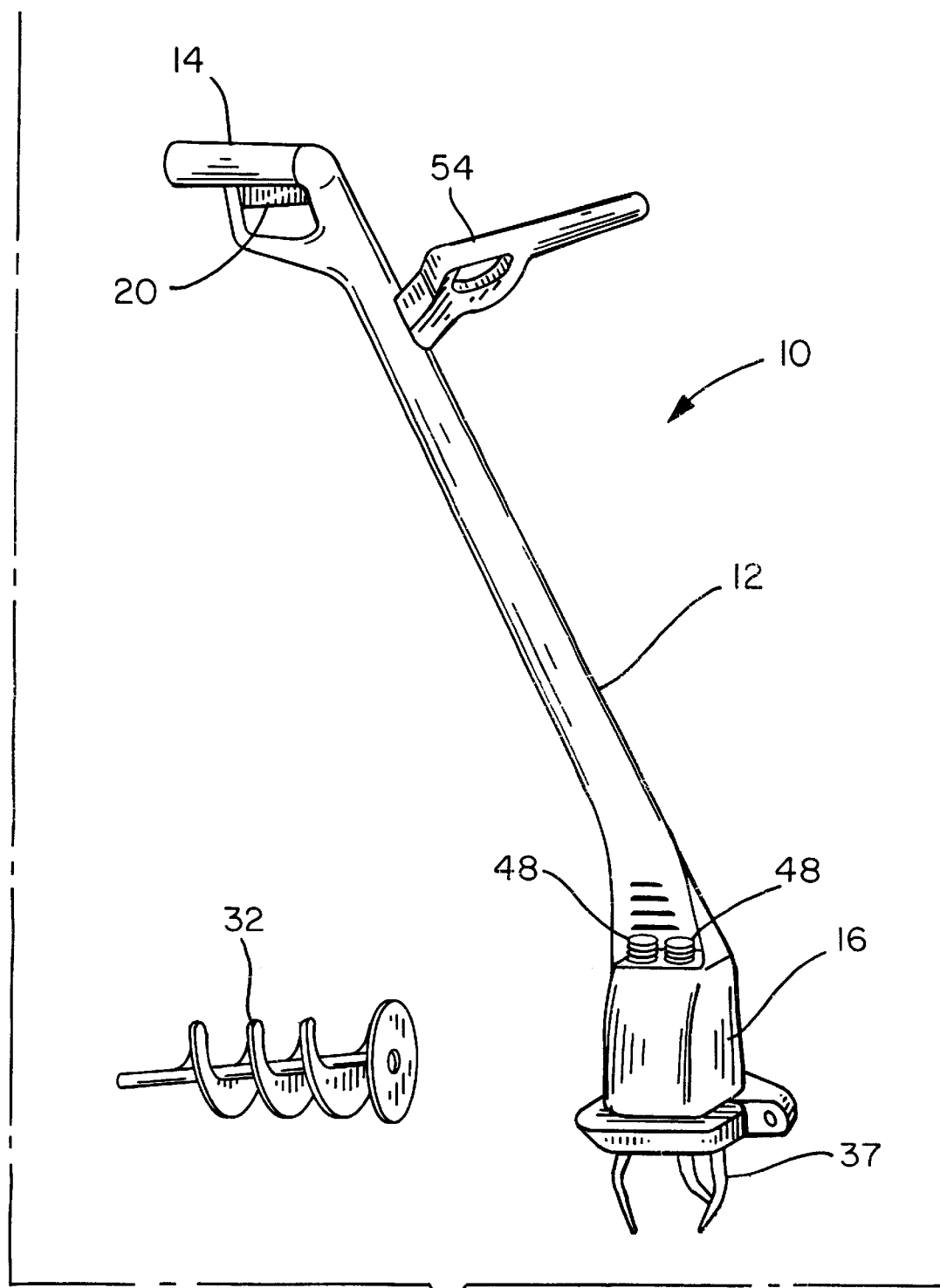
FIG. 1 is a perspective view of the tool of the present invention with one of the interchangeable implements adjacent to the tool and another of the implements attached to the tool.

The power-driven lawn and garden tool 10 has a wand 12 with a handle 14 at one end and a housing 16 at the opposite end (FIG. 1). The housing 16 contains an electric motor 18. The electric motor 18 may be a permanent magnet-type low voltage motor powered by batteries as will be described or it may be a motor powered by standard AC current and connected by wire to a standard convenience outlet. A battery-powered motor which has been found satisfactory is Model HC683LG manufactured by Johnson which has a nominal speed of approximately 7000 rpm and an output torque of approximately 20 inch ounces. Other types of electric motors known to persons skilled in the art may be used. An electric switch 20 is mounted in the tool 10 to control power to the electric motor 18. Preferably, the switch 20 is located in the handle 14 convenient to the hand of the operator of the tool.

Figure 2:
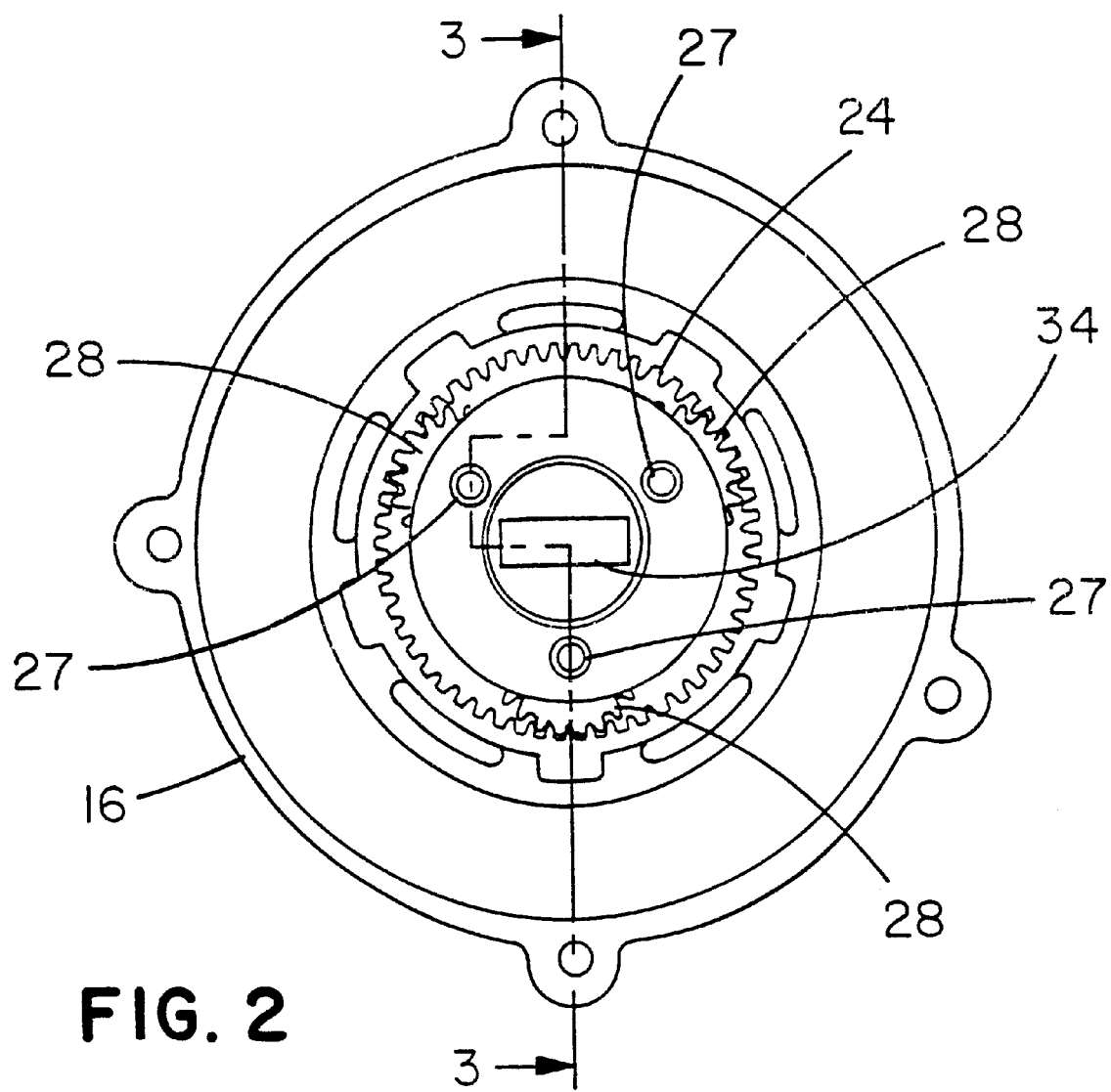
FIG. 2 is a bottom view of the tool with the adapter plate and output shaft removed.
Figure 3:
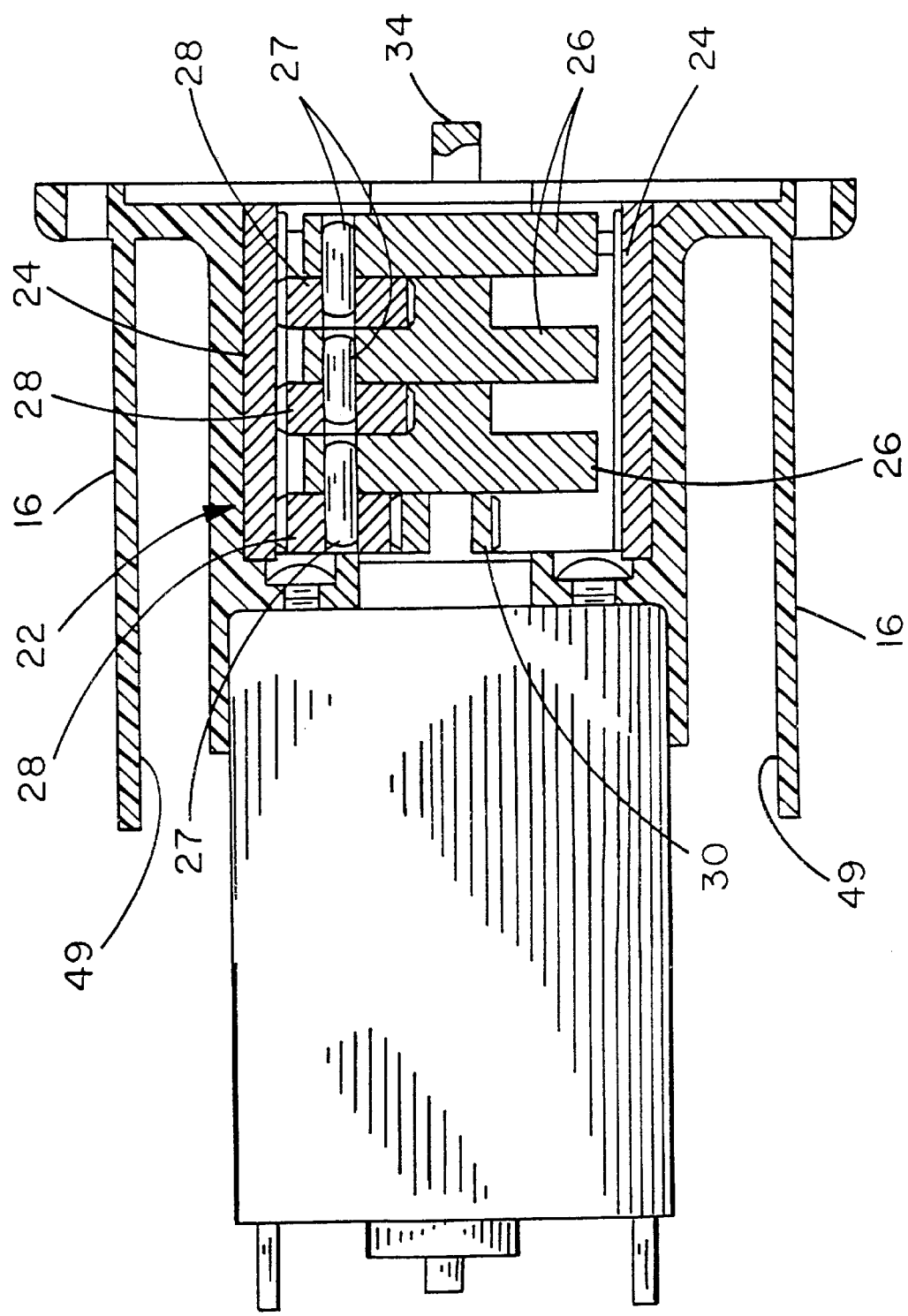
FIG. 3 is a partial cut-away view of the housing showing the motor and the sets of gears, the gears and a portion of the housing being in cross section.
Figure 7:
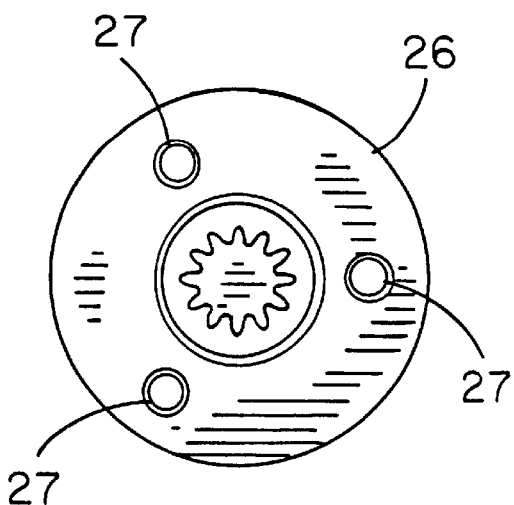
FIG. 7 is a top plan view of the sun gear.
Figure 8:
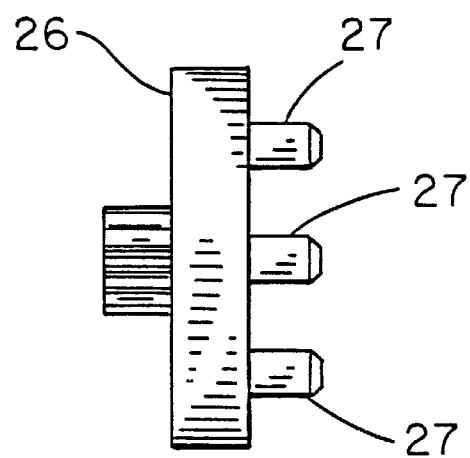
FIG. 8 is a side elevation view of the sun gear of FIG. 7.
Figure 9:
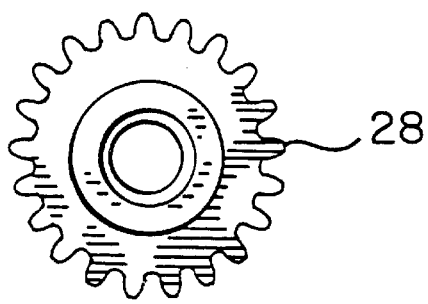
FIG. 9 is a top plan view of a planetary gear.
Figure 10:
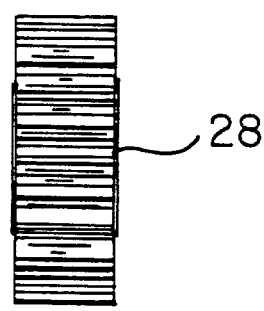
FIG. 10 is a side elevation view of the planetary gear.
Figure 12:
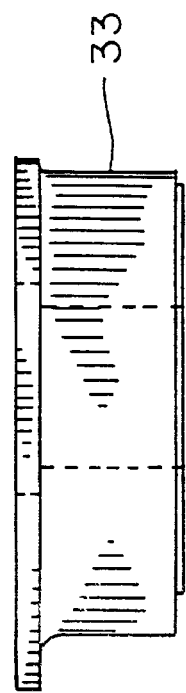
FIG. 12 is a side elevation view of the output housing.
Figure 13:
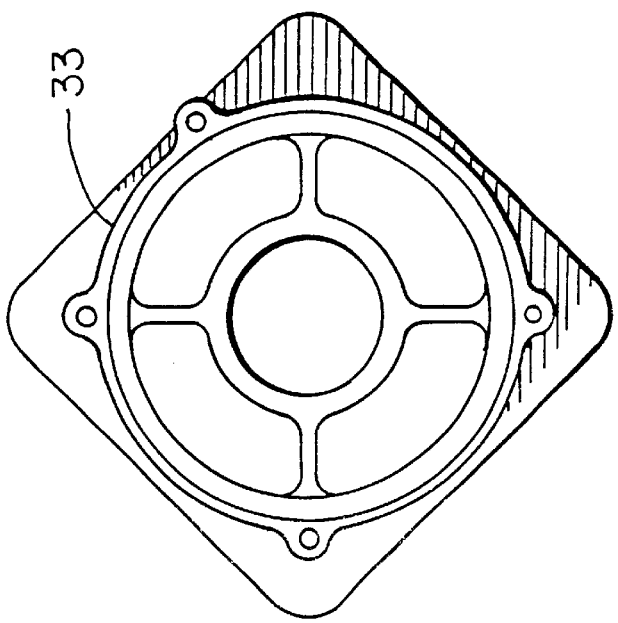
FIG. 13 is a top plan view of the output housing.
Figure 11:
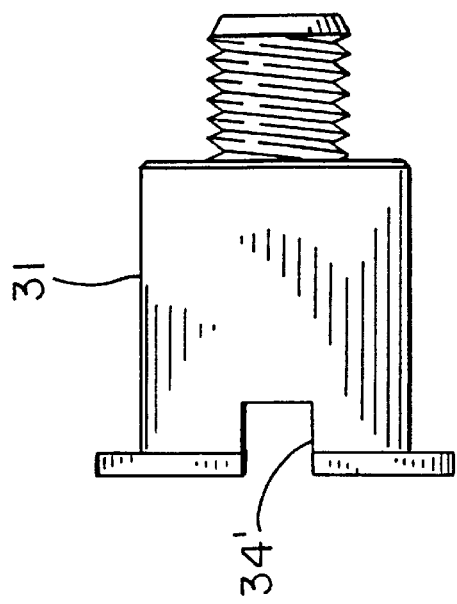
FIG. 11 is a side elevation view of the output shaft.

On the inner wall of the housing 16, there is formed an annular internal gear 24 (a ring gear) having spaced-apart teeth (FIGS. 2 and 6). Also within the housing 16, there is disposed a plurality of sets of gears 22 which are connected to the motor 18 (FIGS. 2–5). Each set of gears 22 has a centralized sun gear 26 (FIGS. 7–8) which has teeth to engage cooperating teeth on a plurality of planetary gears 28 (FIGS. 9–10). The gears are connected with pins 27. The output of the motor 18 preferably is an output gear 30 (FIGS. 2, 4, 5) which drives the first planetary gear 28 in the first set of gears 22. The sets of gears 22 are connected in a cascade or stacked manner in such a manner as to significantly reduce the speed of the sets of gears from the speed of the motor. The gear ratio, preferably is approximately 120:1 to 160:1 so that the output of the sets of gears is less than 100 rpm at very high torque. At a ratio of 120:1, the output torque is in the range of 6–12 foot pounds. In a preferred embodiment, the output torque is 8.88 foot pounds. The output speed is approximately 30–60 rpm with a preferred speed being approximately 40 rpm. The output speed and torque is dependent on the speed of the motor and the arrangement and types of gears used in the sets of gears 22 and may be selected during manufacture of the tool to provide the desired speed and torque consistent with the nature and types of implements which will be used with the tool 10. An advantage of the gear arrangement and the low speed output is to reduce drain on the batteries and provide a longer battery life in the embodiment which is powered by batteries. The output of the set of gears 22 is connected to a selected implement 32 by means known to persons skilled in the art. In a preferred embodiment (FIG. 2) the output of the sun gear 26 of the final set of gears 22 is formed as an elongated bar 34 which is received in and engages a cooperating slot 34' in an output shaft 31. It is further preferred that the output shaft 31 pass through an output housing 33 which spaces the selected implement from the gear set 22 (FIGS. 11–13). The output shaft 31 has an end distal from the gear set 22 which may be threaded to be received in a cooperatively threaded nut-like means 35 connected to the adapter plate 40. It is understood that other means, such as engaging gears, may be used to transmit force between the gear sets 22 and the implements 32.

Figure 14:
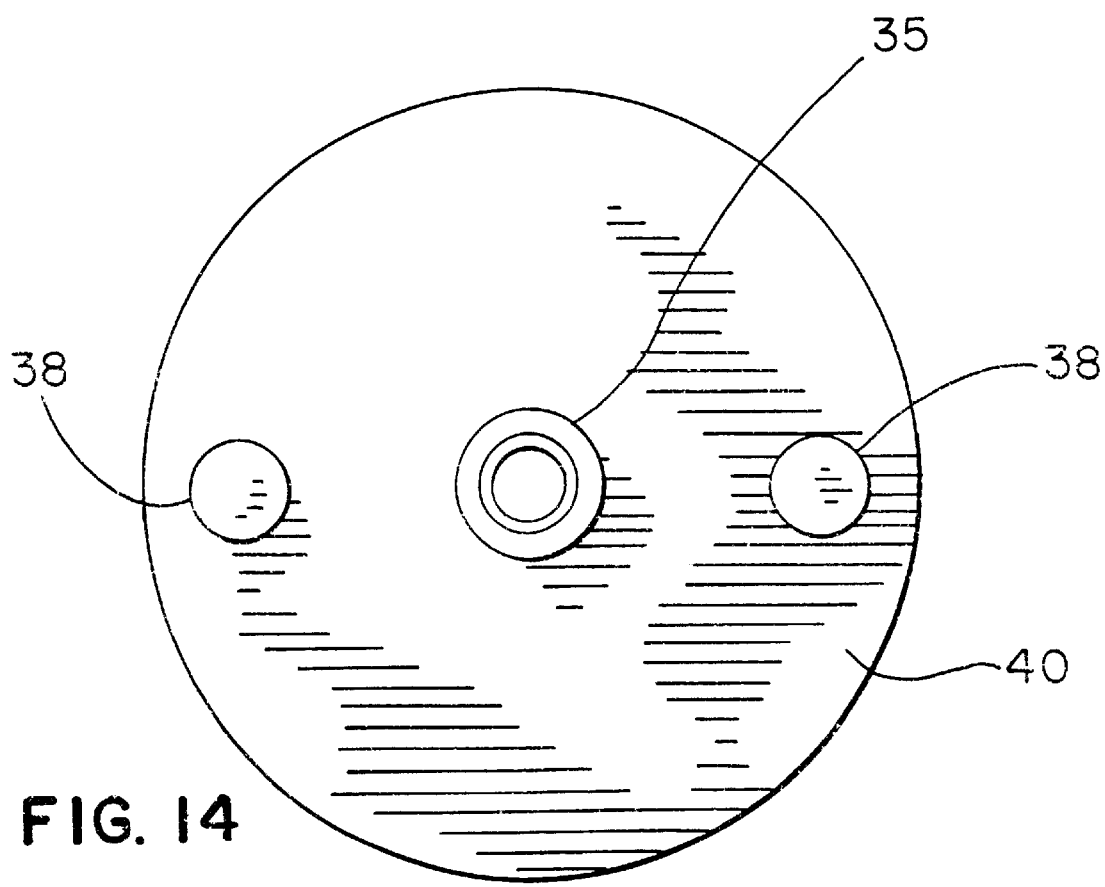
FIG. 14 is a bottom plan view of the adapter plate.
Figure 15:
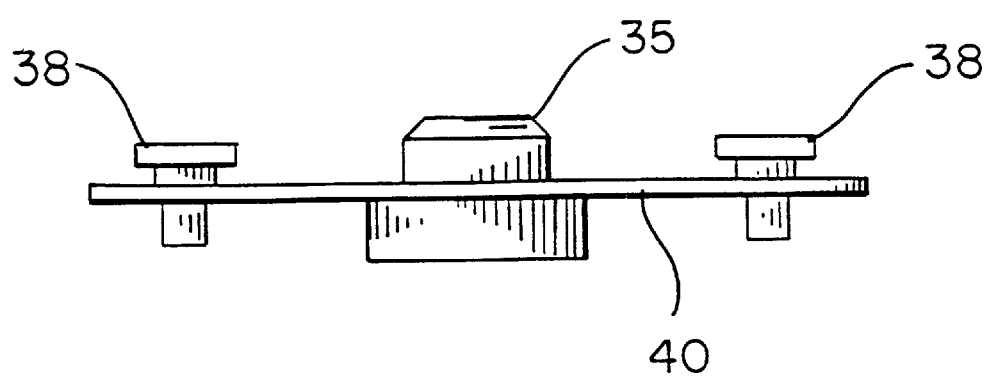
FIG. 15 is a side elevation view of the adapter plate.
Figure 16:
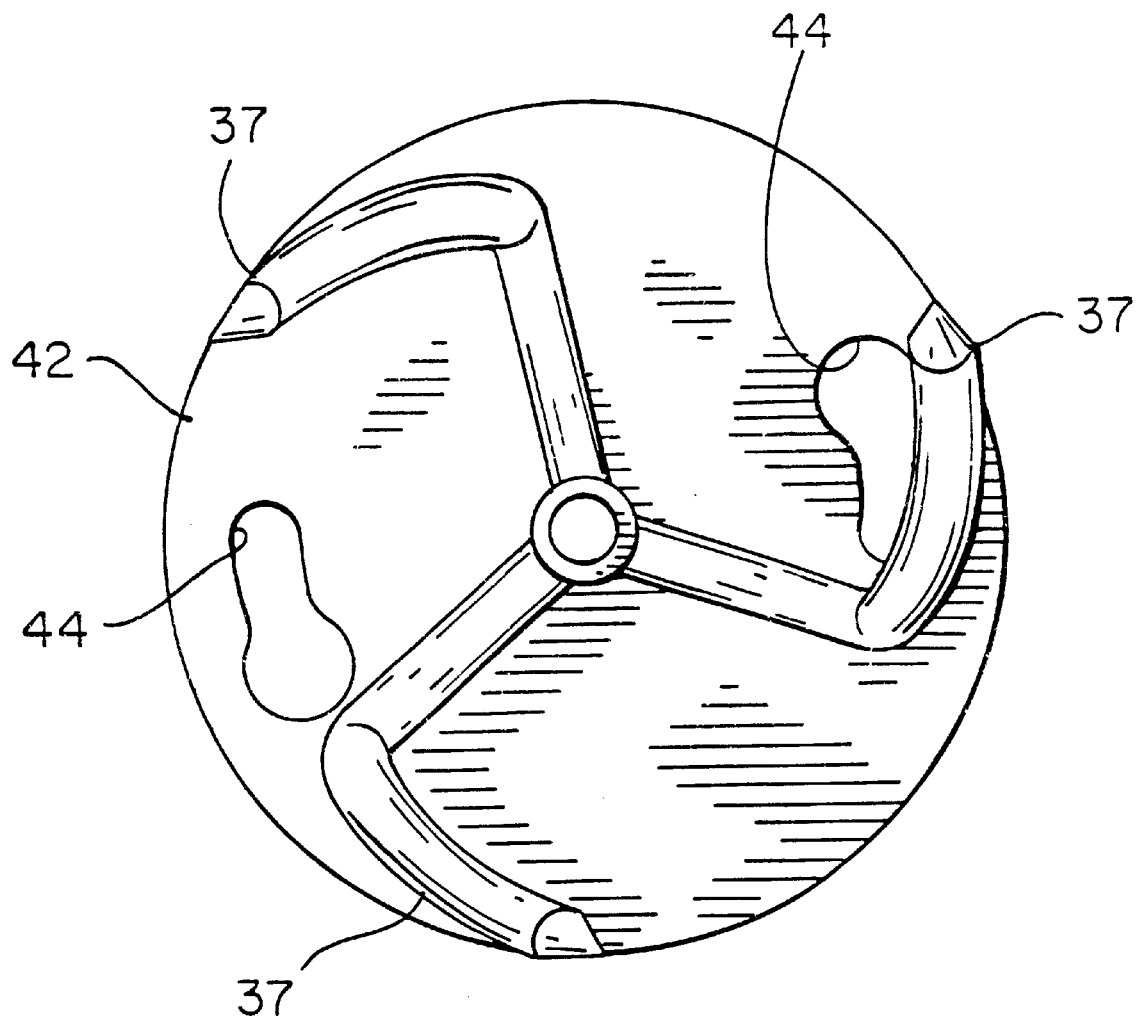
FIG. 16 is a bottom elevation view of the tiller implement.
Figure 19:
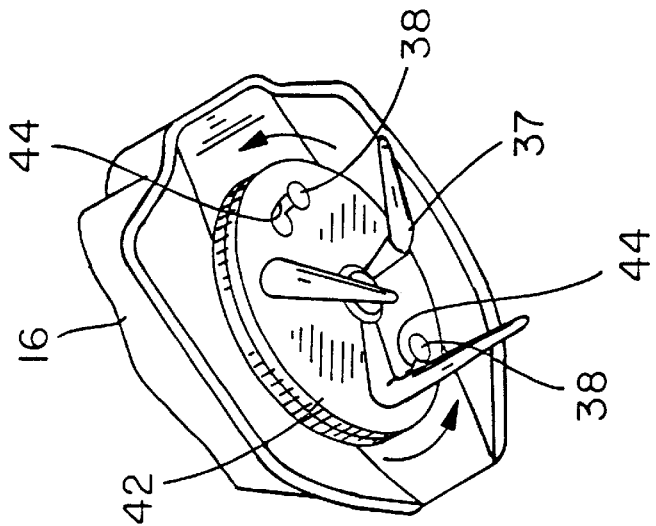
FIGS. 17–19 are a sequence of perspective views showing the attachment of the implement by a twist and lock system.
Figure 18:
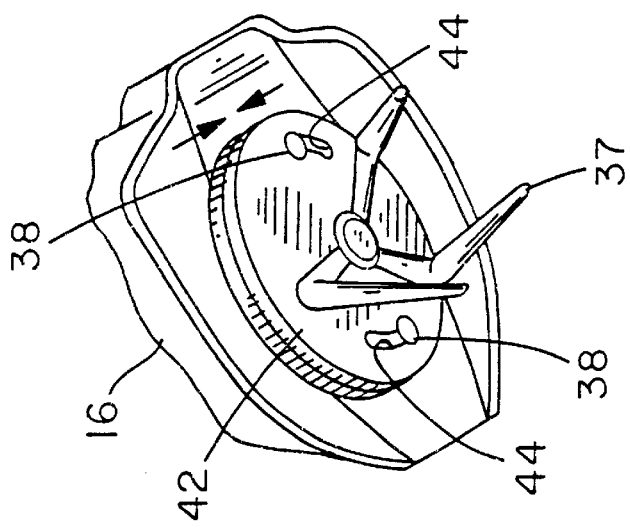
Figure 17:
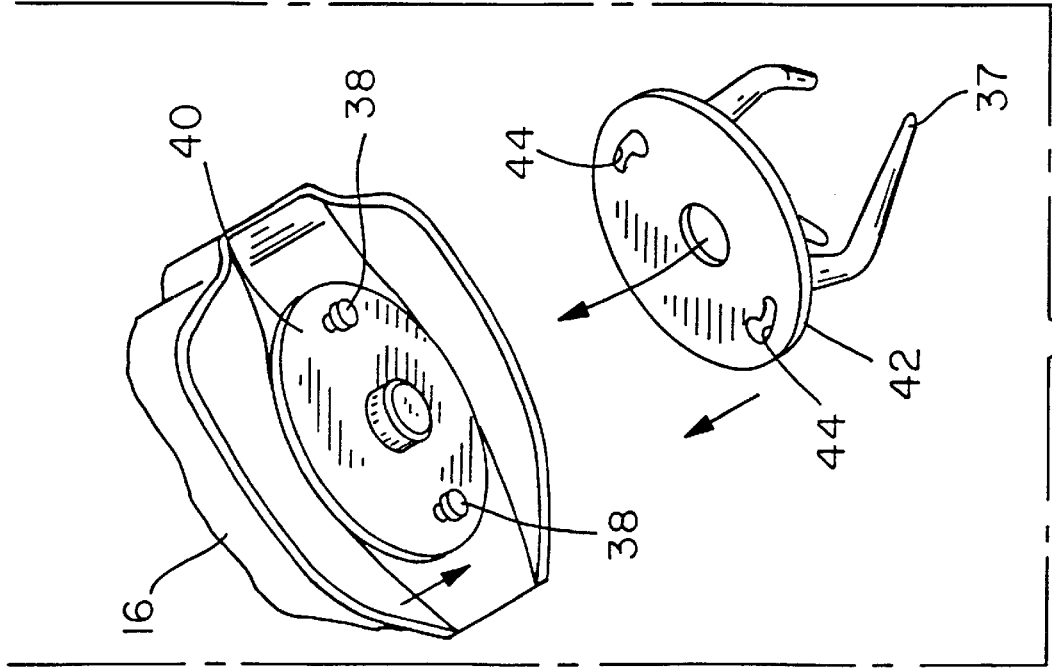
Figure 20:
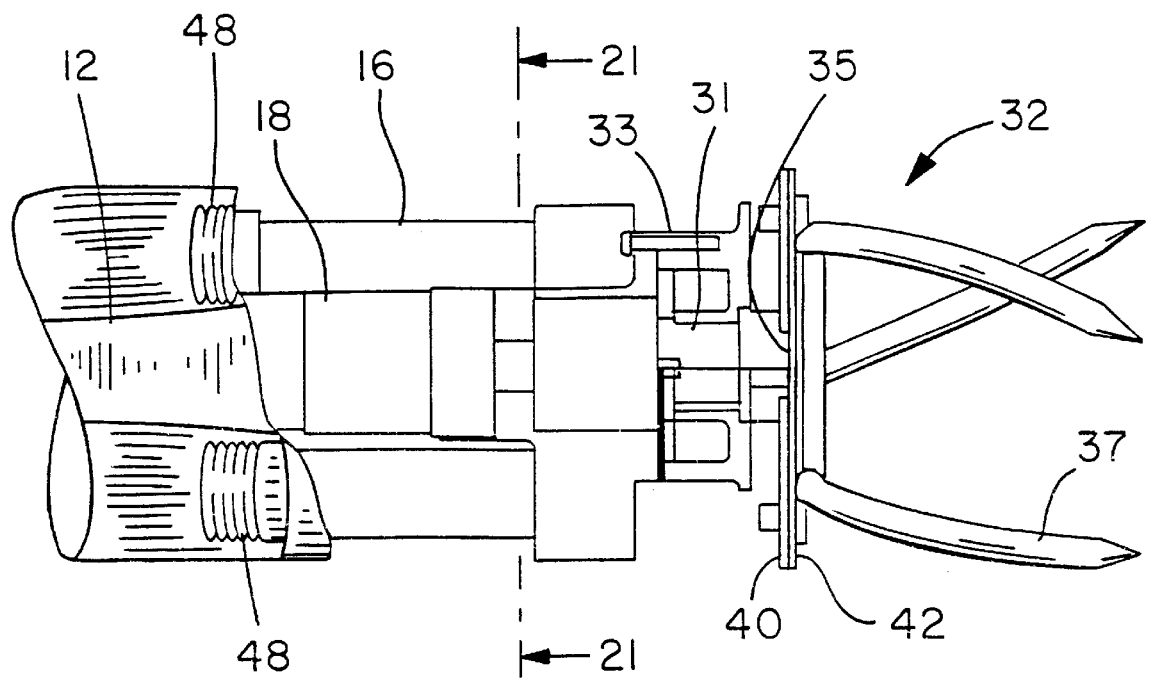
FIG. 20 is a partial cut-away view showing the implement connected to the output of the tool.

A plurality of implements 32 are provided for use as a part of the tool. The implements 32 are all interchangeably attached to the housing 16 by a simple easily connected/disconnected means (FIGS. 14–16). A preferred means is a twist and lock type junction in which projecting pins 38 on the adapter plate 40 attached to the output of the sets of gears 22 is engaged in slots or recesses 44 in the implement plate 42 (FIGS. 17–19). The drive from the gear sets is directly engaged with the rotatable center shaft in the implement as noted above. Other locking means may be used.

Figures 34, 35:
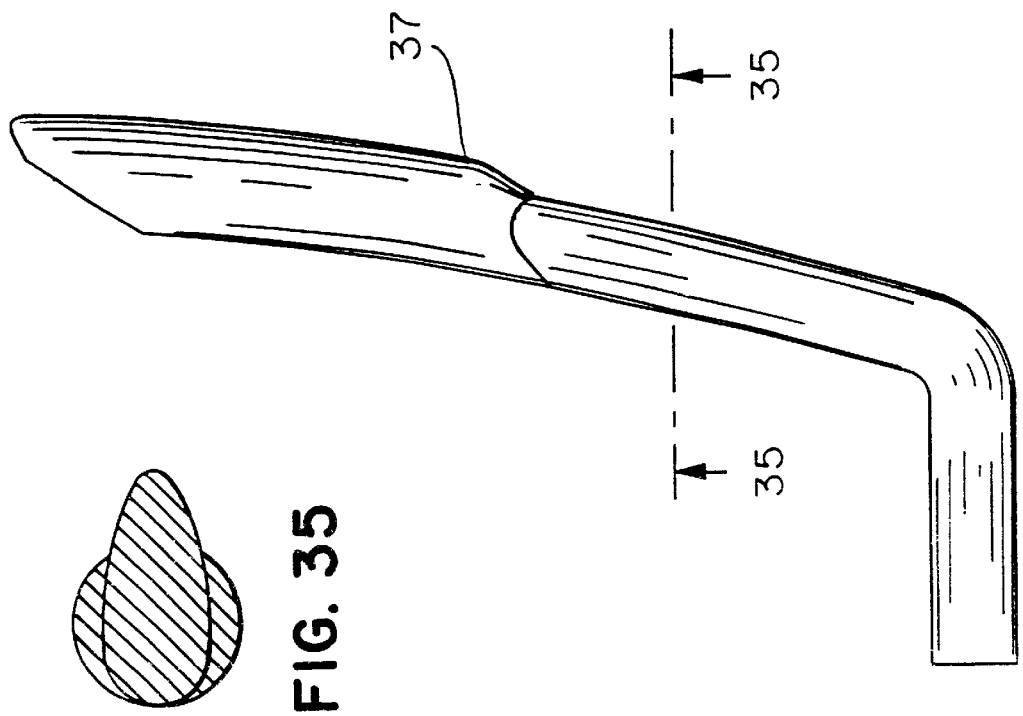
FIG. 34 is a side elevation view of another embodiment of an arm of the tiller having a cutting blade.
FIG. 35 is an enlarged cross section view taken across the lines 35—35 of FIG. 34.
Figures 32, 33:
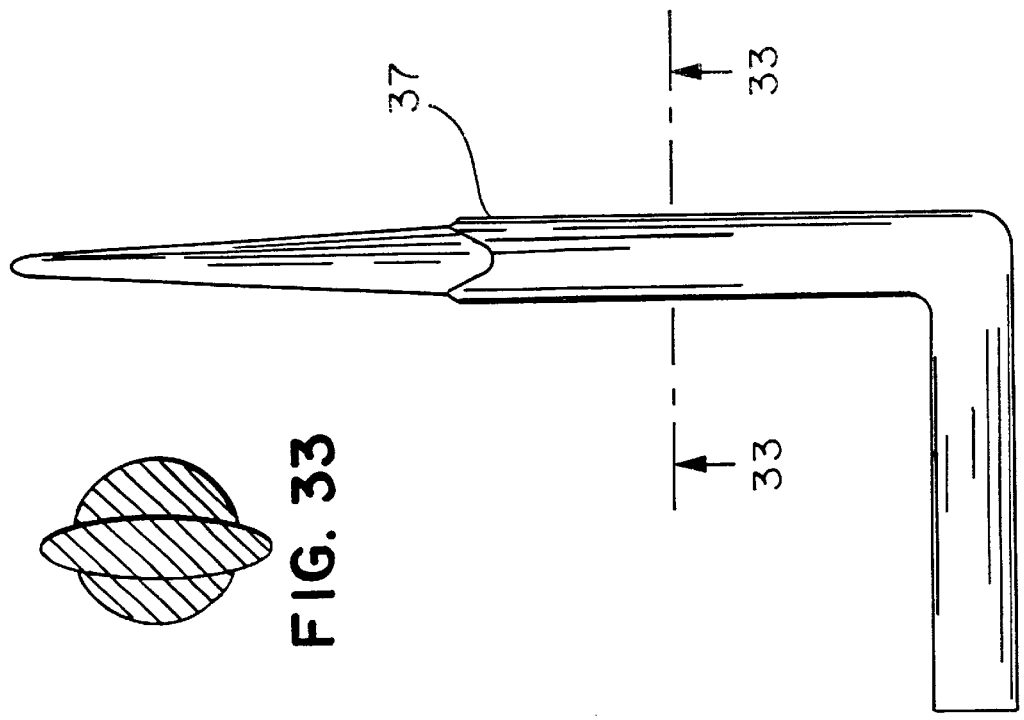
FIG. 32 is a side elevation view of one embodiment of an arm of the tiller implement.
FIG. 33 is an enlarged cross section view taken along the lines 33—33 of FIG. 32.
Figure 38:
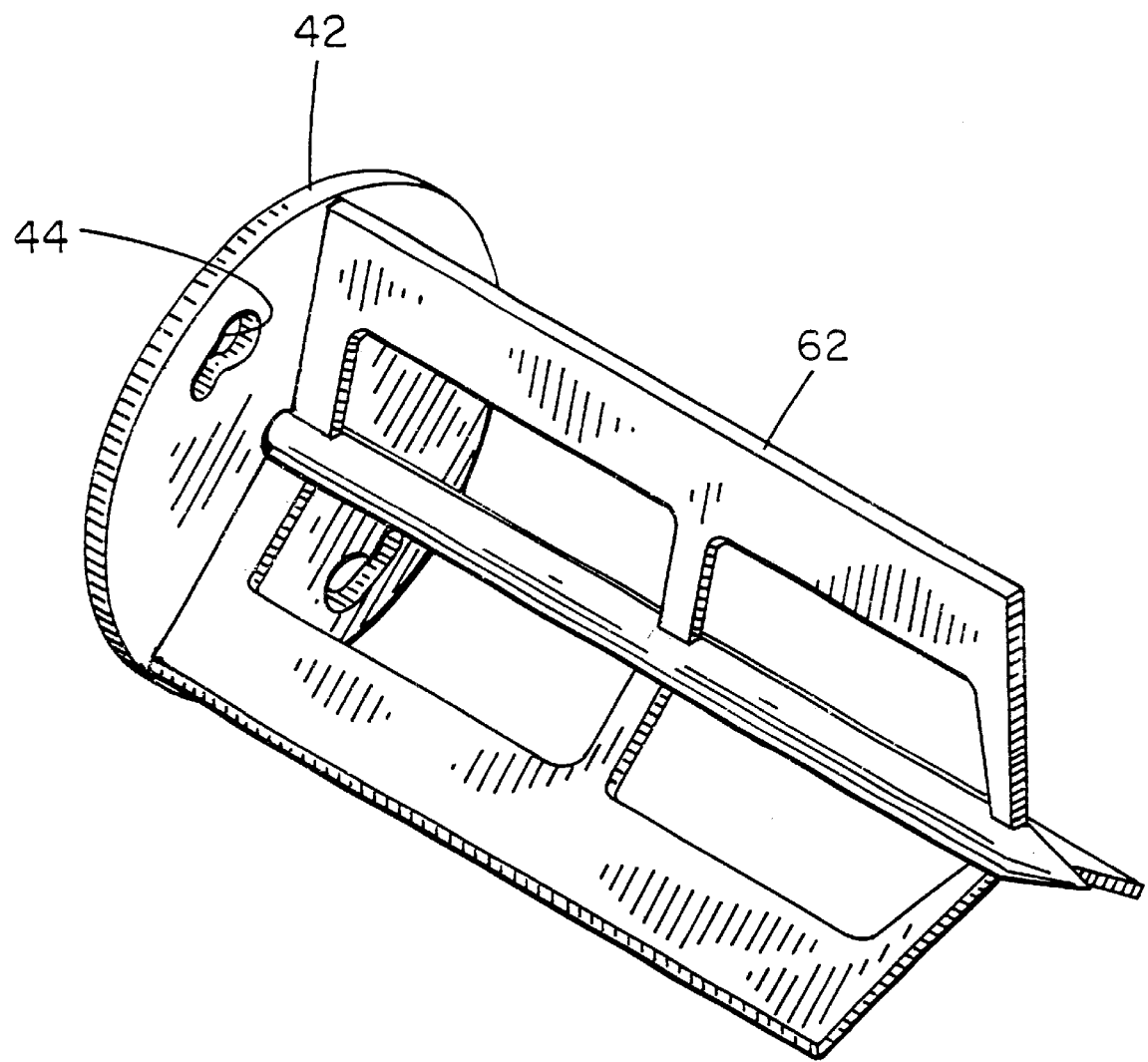
FIG. 38 is a perspective view of a mixer mounted on the implement plate.

The implements may be many and of varied types. The following are typical examples and are not, in any manner, limiting. FIGS. 16–20 show a tiller (aerator) 36 having three angled arms 37 with pointed tips. The tiller arms 37 may be straight or angled. The tiller arms may have a flat or sharpened leading edge to be selected depending upon the nature of the soil, i.e., sandy or loose (FIGS. 32 and 33) or clay soil, roots, etc. (FIGS. 34 and 35). Also, the tiller may have two arms or four arms. Additional implements may be an auger 32 which may be used for digging post holes, aerating and fertilizing (FIGS. 1 and 28), a core drilling implement 60 for bulb planting (FIGS. 36 and 37), a mixer for concrete, driveway coating, etc. (FIG. 38) and other implements not limited to those set forth herein. The tool 10 may also drive two cooperating implements such as side-by-side tillers 46 (FIGS. 30 and 31). One tiller is driven in a clockwise direction and the second tiller is driven in a counterclockwise direction. This type of tiller does not "walk" during use and provides more effective working of the ground. Thus, the lawn and garden tool of the present invention is a very versatile tool.

As shown in FIGS. 17–19, the implement 32 is easily attached and removed from the tool 10. A center opening in the implement plate 42 is aligned with the nut-like means 35 on the adapter plate 40 such that the pins 38 on the adapter plate 40 are oriented with respect to the recesses 44 in the implement plate 42. Alternately, the pins 38 may be on the implement plate 42 and the recesses 44 may be in the drive plate. Also, the drive means on the output of the sets of gears (such as the bar 34) is simultaneously aligned with the slot in the center shaft of the implement. Preferably, the pins 38 have an enlarged head and the recesses are in the form of a slot having an end with an enlarged diameter. The heads of the pins 38 are received in the enlarged diameter of the recesses and the adapter plate 40 and the implement plate 42 are twisted with respect to one another such that the heads of the pins 38 are locked in the more narrow portion of the recesses thereby securing the implement plate 42 (and also the implement) with the adapter plate 40 (and also the tool 10). Reversing the procedure removes the implement 38 from the tool 10.

Also, the tool may be made as a single purpose tool with the implement 32 permanently attached to the output of the gear system. Thus, a family of tools may be provided, each for a specific use.

Figure 21:
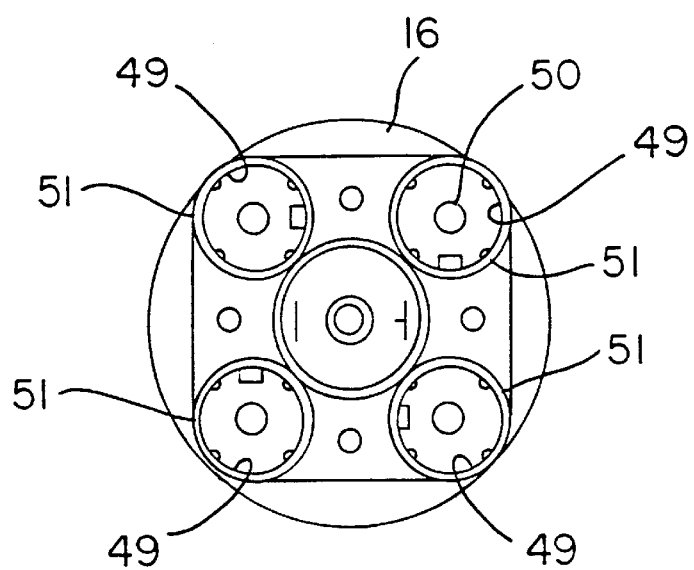
FIG. 21 is a view across lines 21—21 of FIG. 20 showing the battery wells in the housing.
Figure 22:
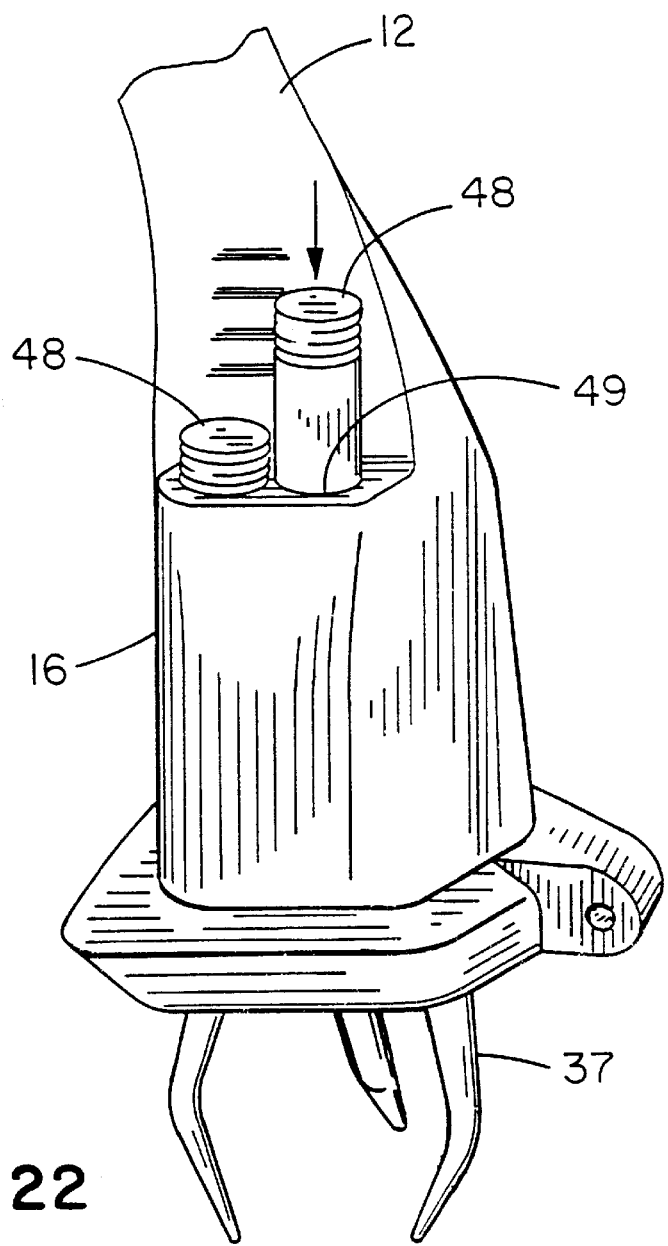
FIG. 22 is a perspective view showing the rechargeable batteries being inserted into the tool.
Figure 23:
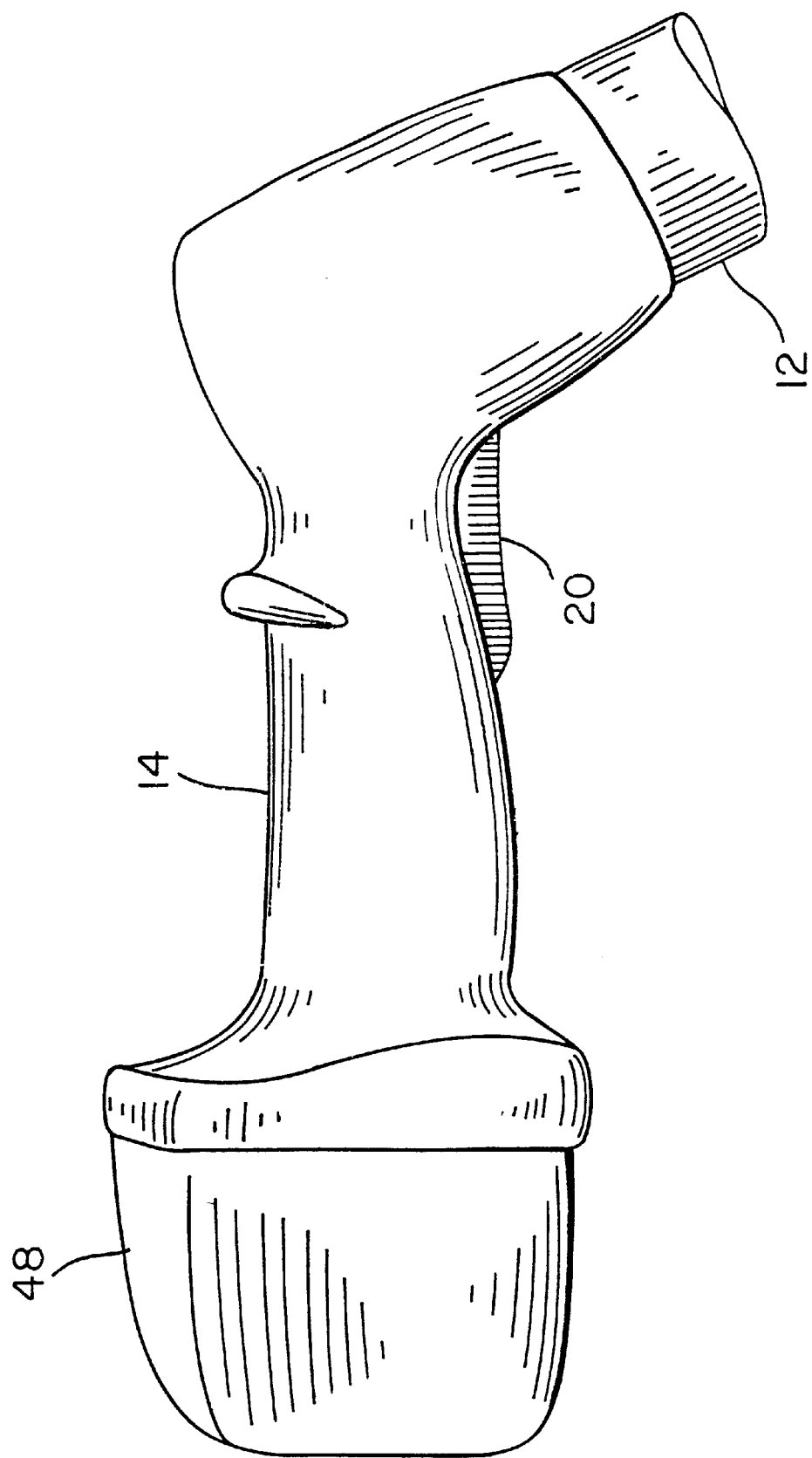
FIG. 23 is a perspective view of the handle portion of the tool having a replaceable battery pack.

The battery-operated embodiment preferably has at least one replaceable, rechargeable battery 48 removably received in the tool 10 (FIGS. 21, 22 and 23). Preferably, a battery pack is used and in one embodiment, four battery packs such as "VERSAPAK" Model VP 100 Type 2 made by Black and Decker are slidably received in pockets or wells 49 formed in the outer surface of the housing 16. In this embodiment the battery pack may have a positive center post and a negative annular ring which makes electrical contact with cooperating positive and negative terminals 49, 50 in the pocket 50. This arrangement assures electrical contact and prevents incorrect insertion of the battery pack. A means such as a clamp, detent means or retaining pocket cover is provided to keep the battery pack in the pocket and in electrical contact during use of the tool 10. It is understood by persons skilled in the art that other types of batteries may be used and may be mounted in the tool in a manner different from the example described above. For example, a rechargeable battery may be mounted in the tool with an electrical connection for recharging the battery.

For example, FIG. 23 shows a battery pack 48 such as "SKIL 92931" made by S. B. Power Tool which is attached to the handle 14. The battery pack 48 may have prongs which make electrical contact with cooperating receptors in the handle 14. An electrical switch 20 may be incorporated in the handle 14. The switch 20 may be load sensitive to open and remove power from the tool if the current spikes due to the tool locking up or jamming.

Figure 24:
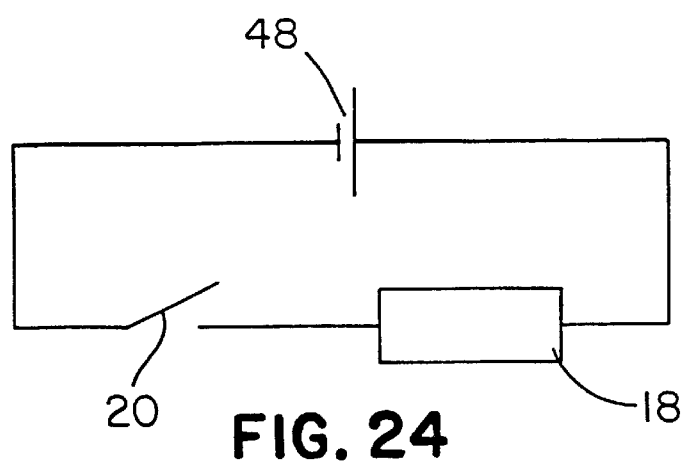
FIG. 24 is an electrical diagram showing the connection of the power source to the motor through a switch.

FIG. 24 shows a typical electrical wiring diagram. If the battery is formed from more than one battery pack, the batteries are connected in series. In a four battery pack, each battery pack has an output voltage of 3.5V to power the 14V motor. It is understood that the voltage of the motor may be different from the example given herein and battery packs having the appropriate voltage would be used. An electrical switch 20 is to provide the operator with control over the power to the tool. A typical layout of the disposition of the battery connections in the tool 10 is shown in FIG. 21.

Figure 25:
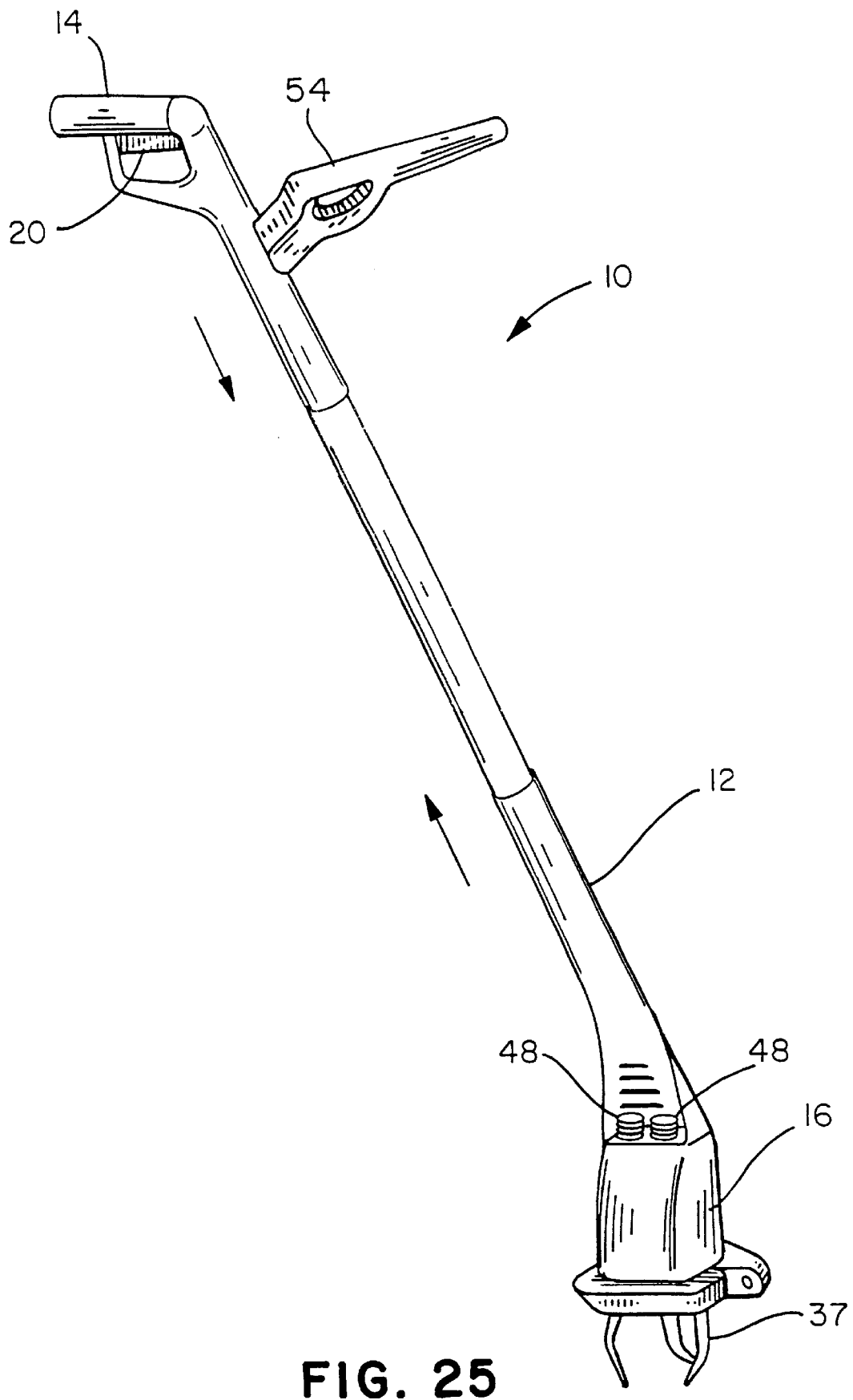
FIG. 25 is a perspective view showing the length of the wand being adjusted.

The tool 10 may be used by a standing, kneeling or seated operator and, to have a versatile tool which can be used in all of these postures and also to provide.more comfortable use by operators of differing heights, the wand 12 may be made adjustable (FIG. 25). A telescoping wand may be provided with adjustable stop and locking means known to persons skilled in the art. Alternately, the wand 12 may be made with a shorter length and a separate embodiment may have a longer length.

Figure 26:
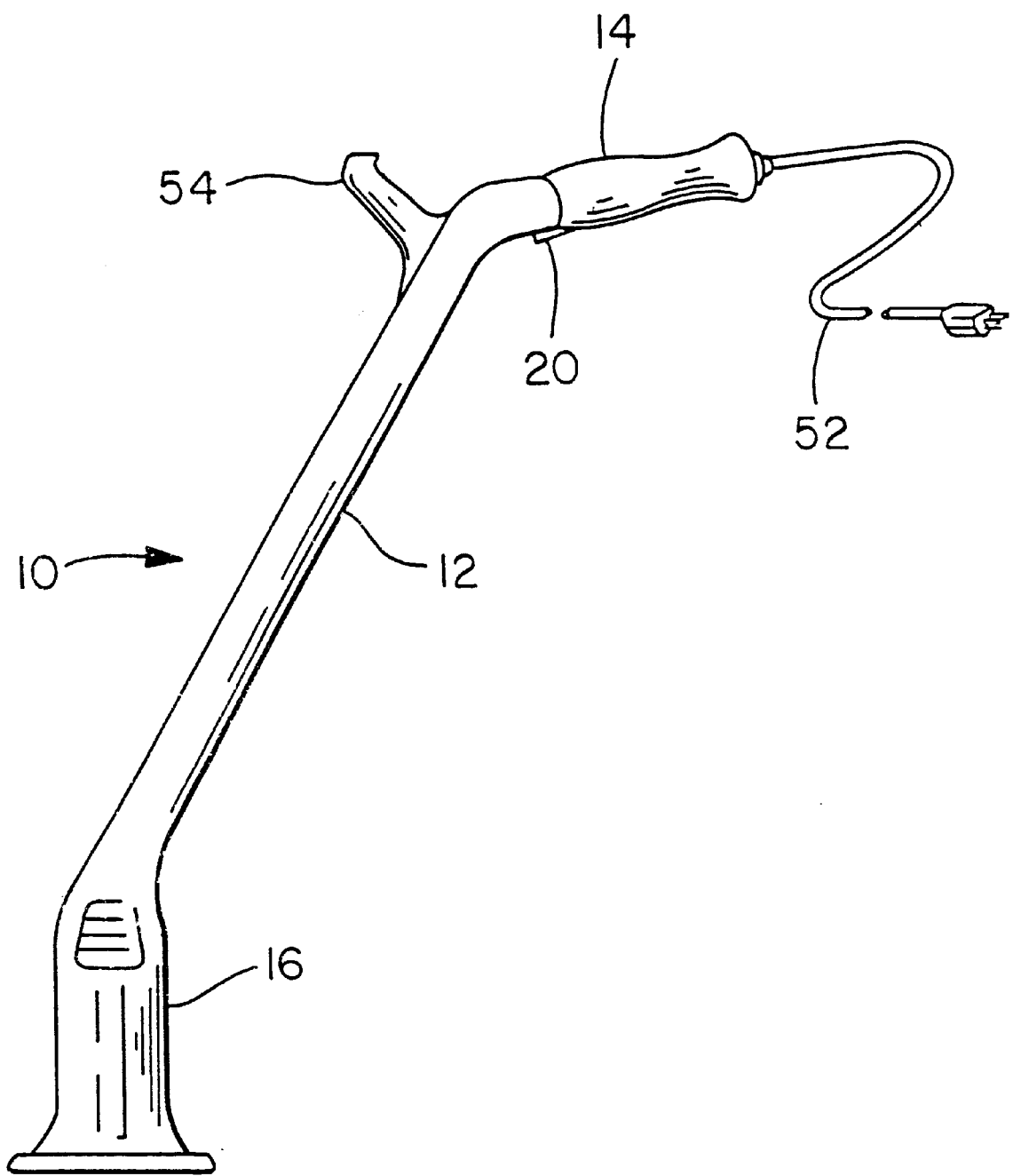
FIG. 26 is a side elevation view of an alternate embodiment showing an angled handle having a connector therein to which is attached an electrical cord to a source of power.

The tool 10 may be powered by standard commercially available electrical power such as 115V AC. FIG. 26 shows an angled handle 14 on the first end of the wand 12 with an electrical connector formed in the angled handle 14. An electrical cord is connected to the connector in the handle 14 and extends to a convenience outlet for 115V AC power. The electrical cord may also be connected to a source of power carried as a back pack or waist pack by the operator. The switch 20 is placed in the handle 14 for ready access to the hand of the operator. Also, an auxiliary balance handle 54 may be mounted on the wand 12 to assist the operator in two-handed use of the tool 10. The balance handle 54 may be fixedly or adjustably mounted on the wand and may include an extension to assist in torque control.

Figure 27:
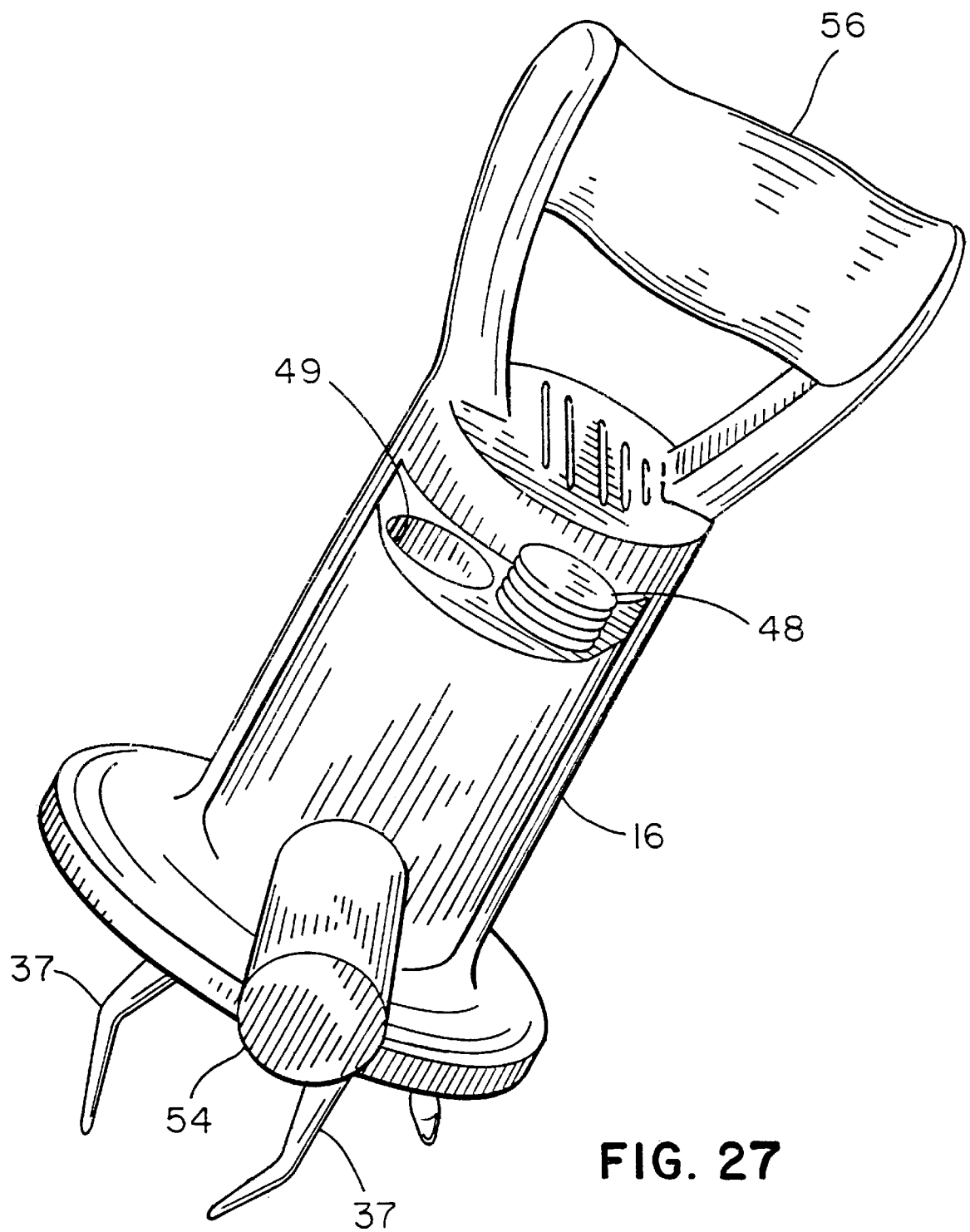
FIG. 27 is an alternate embodiment having a D handle attached to the housing.

In still another embodiment (FIG. 27), a D-shaped handle 56 may be formed on the first end of the wand 12 or may be formed on the housing 16. An auxiliary handle 54 may be included to steady the tool against rotation while in use. Other handle shapes such as a pistol type handle may be used.

Figure 28:
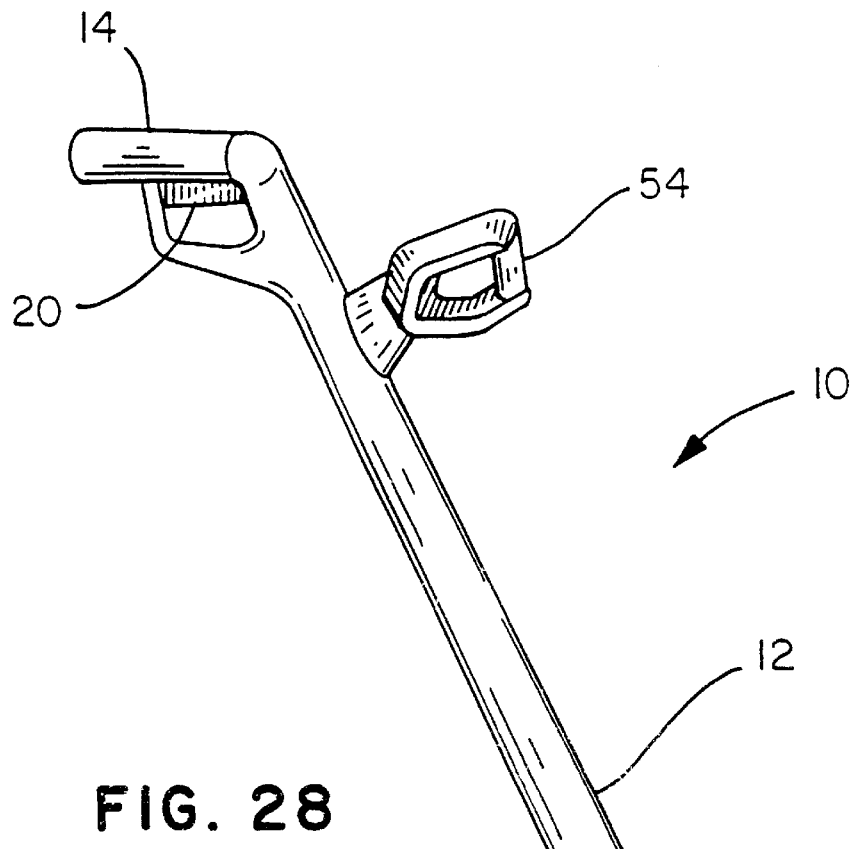
FIG. 28 is a perspective view of the tool having an internal combustion engine.
Figure 29:
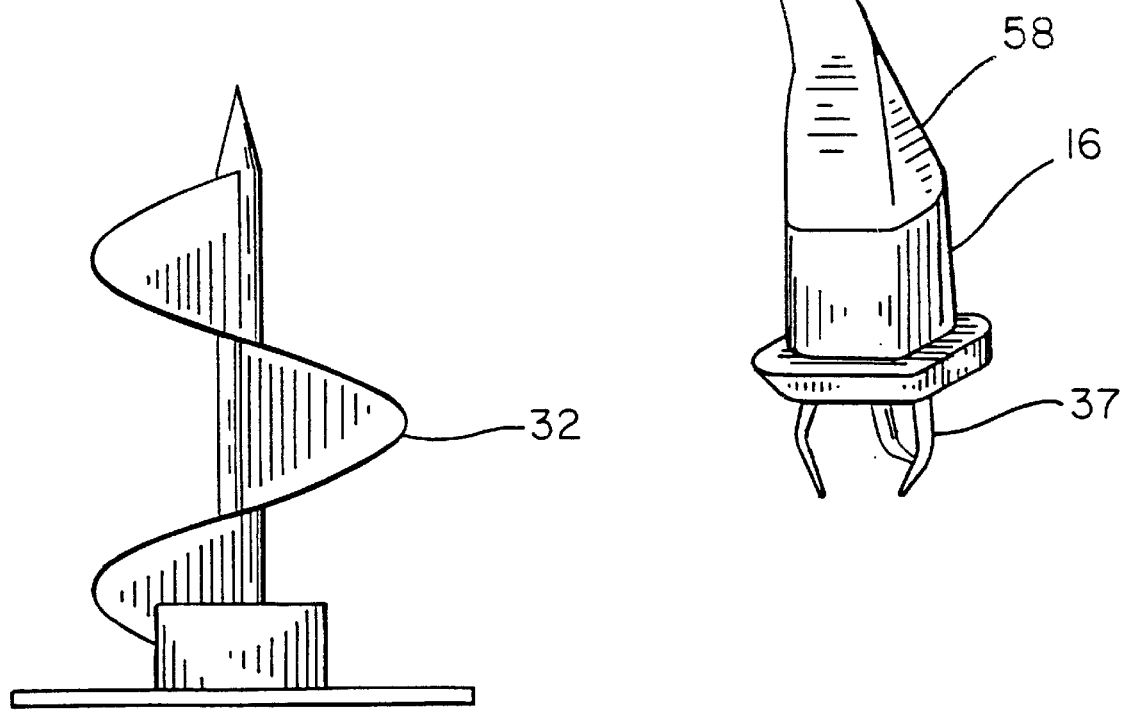
FIG. 29 is a side elevation view of an auger-type implement.

The tool 10 may also be powered by an internal combustion engine 58 (FIG. 28). The output from the engine 58 is used to drive the sets of gears 22 in a manner similar to the drive by electrical motors. A switch is included in the handle to turn off the engine 55.

Thus, there is disclosed a compact, portable tool which has interchangeable implements and is used for lawns and gardens. Due to low speed, high torque output obtained from the engine gearing between the power source and the implements, a very efficient tool is provided.

Obviously, many modifications may be made without departing from the basic spirit of the present invention.

Accordingly, it will be appreciated by those skilled in the art that within the scope of the appended claims, the invention may be practiced other than has been specifically described herein.

We claim:

1. In a lawn and garden tool, wherein a motor drives a soil-working implement through planetary gearing for a very high-torque low-speed operation, the improvement which comprises a housing disposed above the ground and including a gear case, a motor mounted directly above the gear case and having a motor shaft rotating about a substantially vertical axis and protruding within the gear case, a plurality of planetary gears in the gear case, arranged in cascade, and driven by the motor shaft, the plurality of planetary gears having an output shaft driving an adapter plate disposed below the housing, and at least one tool implement carried by the adapter plate and rotating about an axis which is substantially parallel to the axis of the motor shaft.

2. The improvement of claim 1, wherein the plurality of planetary gears includes at least two sets of gears arranged in cascade to provide a low speed, high torque output, and wherein the motor is an electric motor powered by at least one rechargeable battery pack.

3. The improvement of claim 2, wherein the gear system reduces the speed of the tool implement to less than 100 rpm.

4. The improvement of claim 3, wherein the speed of the tool implement is approximately 30 to 60 rpm.

5. The improvement of claim 2, wherein the housing is attached to one end of a wand and a handle is attached to the opposite end of the wand.

6. The improvement of claim 2, further comprising a single ring gear disposed within the gear case of the housing and engaging the plurality of planetary gears.

7. The improvement of claim 2, wherein the at least one battery pack is inserted in the housing of the lawn and garden tool.

8. The improvement of claim 2, wherein the at least one battery pack is inserted into a handle connected to the housing.

9. The improvement of claim 1, further including:

a wand having a first end and an opposite second end, a handle connected to the first end of the wand, the housing being connected to the second end of the wand, and a plurality of interchangeable implements.

10. The improvement of claim 2, wherein the torque applied to the tool implement is approximately 6 to 12 foot pounds.

11. The improvement of claim 1, wherein the implement is removably attached to the adapter plate by a twist and lock-type connector.

12. The improvement of claim 9, wherein the wand has an adjustable length such that the tool may be long for use by a stand-up operator and may be short for use by a kneeling operator.

13. The improvement of claim 1, A wherein the motor comprises an electric motor powered through a line cord connected to a source of power.

14. The improvement of claim 1, wherein the motor comprises an internal combustion engine.

15. The improvement of claim 1, wherein the implement is selected from the group consisting of a tiller, an auger, a mixer and a core driller.

16. The improvement of claim 9, further including an auxiliary handle attached to the wand, the auxiliary handle facilitating use and balance of the tool.

17. In a lawn-and-garden tool, the combination of a housing having a longitudinal axis and further having respective side portions, each of which has at least one opening formed therein generally parallel to the longitudinal axis of the housing, such that at least two opposed openings are provided, one on each side of the tool, at least one rechargeable battery pack removably received in each of the openings in the housing, such that the housing is balanced, a permanent magnet motor within the housing and selectively energized by the battery packs, a plurality of planetary gear systems driven by the motor and arranged in cascade in the housing, an output shaft powered by the planetary gear systems, the output shaft having a relatively-low output speed and, conversely, a relatively-high output torque, and a tool implement externally of the housing and driven by the output shaft.

* * * * *